United States Patent
Dawson et al.

(10) Patent No.: US 8,140,485 B2
(45) Date of Patent: Mar. 20, 2012

(54) DATA RECOVERY USING A MINIMUM NUMBER OF RECOVERY STREAMS

(75) Inventors: Colin Scott Dawson, Tucson, AZ (US); Howard Newton Martin, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 429 days.

(21) Appl. No.: 12/184,162

(22) Filed: Jul. 31, 2008

(65) Prior Publication Data

US 2010/0030822 A1   Feb. 4, 2010

(51) Int. Cl.
  *G06F 17/30* (2006.01)
(52) U.S. Cl. ........................................... 707/686
(58) Field of Classification Search .............. 707/686, 707/674
  See application file for complete search history.

(56) References Cited

U.S. PATENT DOCUMENTS

| | | | |
|---|---|---|---|
| 6,154,852 A * | 11/2000 | Amundson et al. | 714/5 |
| 6,542,972 B2 | 4/2003 | Ignatius et al. | |
| 6,801,938 B1 * | 10/2004 | Bookman et al. | 709/224 |
| 7,065,619 B1 * | 6/2006 | Zhu et al. | 711/162 |
| 7,246,206 B2 | 7/2007 | Daemmrich et al. | |
| 7,711,713 B2 * | 5/2010 | Cherkauer et al. | 707/686 |
| 7,752,299 B2 * | 7/2010 | Bookman et al. | 709/223 |
| 2005/0131853 A1 * | 6/2005 | Sampath et al. | 707/1 |
| 2007/0094309 A1 | 4/2007 | Buckingham et al. | |
| 2007/0143371 A1 | 6/2007 | Kottomtharayil | |
| 2007/0260834 A1 | 11/2007 | Kavuri et al. | |

* cited by examiner

*Primary Examiner* — Khanh Pham
*Assistant Examiner* — Alexander Khong
(74) *Attorney, Agent, or Firm* — Century IP Group, Inc.; F. Jason Far-hadian, Esq.

(57) ABSTRACT

A data recovery method that uses a minimum number of recovery streams is provided. The method comprises defining a minimum number of recovery streams to be read from during restoration of data from one or more storage volumes in a communication network, wherein the minimum number is determined according to one or more parameters defining availability of one or more resources in the communication network; restoring the data using at least the minimum number of recovery streams to optimize the rate at which the data is restored; and dynamically changing the minimum number of recovery streams, in response to determining that the availability of the one or more resources has changed.

14 Claims, 5 Drawing Sheets

DATA RECOVERY USING A MINIMUM NUMBER OF RECOVERY STREAMS

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

FIELD OF INVENTION

The present invention relates generally to data recovery in a computing environment and, more particularly, to a data management policy that uses a minimum number of recovery streams to restore data.

BACKGROUND

Collocation refers to a data restoration scheme that makes it possible to store large amounts of data in as few storage volumes as possible. Collocation, generally, inhibits parallel access to data during data recovery because it is mostly used in conjunction with data storage on sequential volumes, such as tapes.

Particularly, when data is stored on a single or a small number of storage volumes, the data may have to be read via a single or a correspondingly small number of data recovery streams. Further, since using collocation may result in active and inactive data being commingled on the same volume, restoring active data from such a volume may become very inefficient.

Unfortunately, existing data restoration schemes fail to take a holistic view of data recovery. More comprehensive and efficient systems and methods are needed to overcome the aforementioned shortcomings.

SUMMARY

The present disclosure is directed to systems, methods, and corresponding products that facilitate data recovery using a minimum number of recovery streams.

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a data recovery method that uses a minimum number of recovery streams is provided. The method comprises defining a minimum number of recovery streams to be read from during restoration of data from one or more storage volumes in a communication network, wherein the minimum number is determined according to one or more parameters defining availability of one or more resources in the communication network; restoring the data using at least the minimum number of recovery streams to optimize the rate at which the data is restored; and dynamically changing the minimum number of recovery streams, in response to determining that the availability of the one or more resources has changed.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXEMPLARY EMBODIMENTS

The present disclosure is directed to systems, methods, and corresponding products that facilitate data recovery using a minimum number of recovery streams.

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

Figure 1:
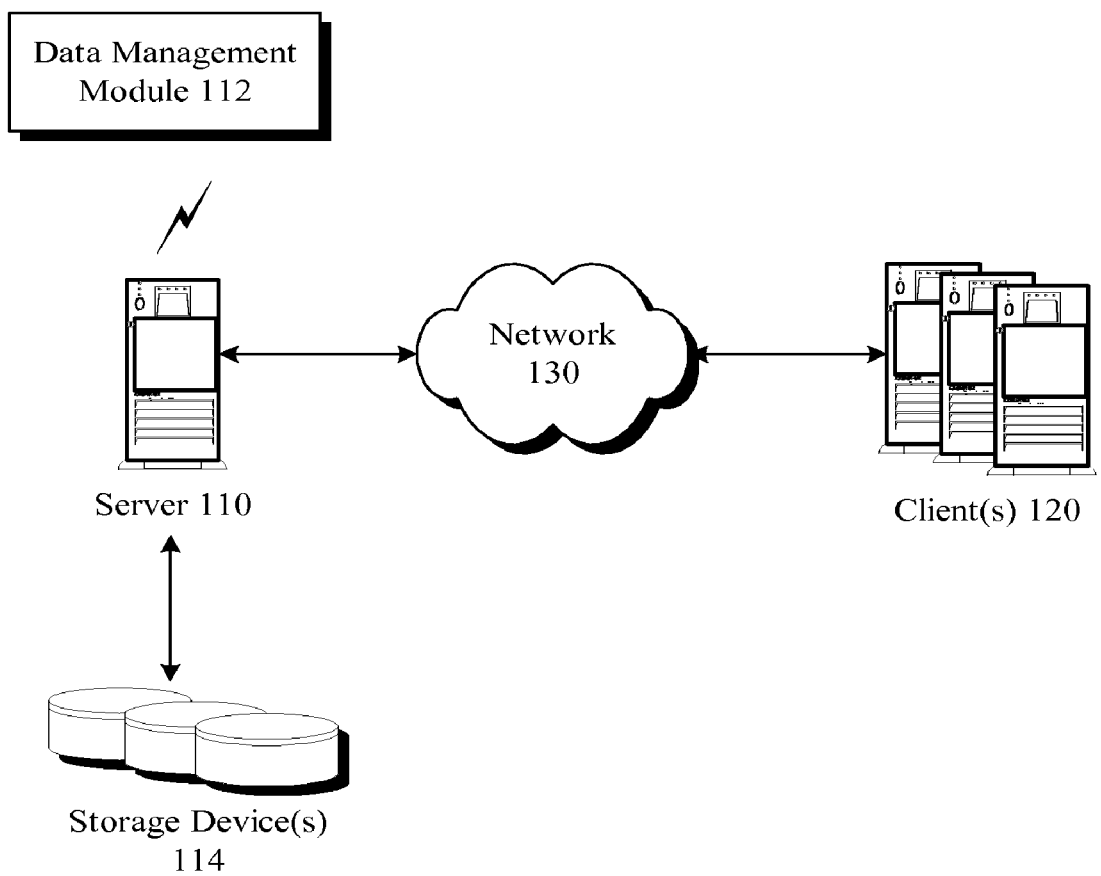
FIG. 1 illustrates an exemplary computing environment in accordance with one or more embodiments.

Referring to FIG. 1, in accordance with one embodiment, an exemplary computing environment 100 may comprise a server 110, data management module 112, one or more data storage devices 114, one or more clients (e.g., computing systems) 120, and network 130. Clients 120 may access data stored in storage devices 114 through server 110 over network 130.

Data management module 112 may be executed over an operating system, or it may be included in data management software, or in other application software executed on server 110 or clients 120 or both, in a local, remote or distributed network environment. Storage devices 114 may comprise random access memory (RAM), flash memory, hard disk drives (HDDs), and other types of storage media, without limitation.

In accordance with one embodiment, to facilitate efficient data restoration, active data pools may be implemented to store active data separately from inactive data, thereby eliminating commingling of active data with inactive data on the same volume. In some embodiments, a no query restore scheme may be also implemented to read data from a random access memory volume in a single session, or to read data from one or more sequential volumes in one or more sessions. The active data pooling and the no query restore schemes may thus be utilized to store data on more than one volume, making more than one recovery stream available to be read from during restoration of data.

Figure 2:
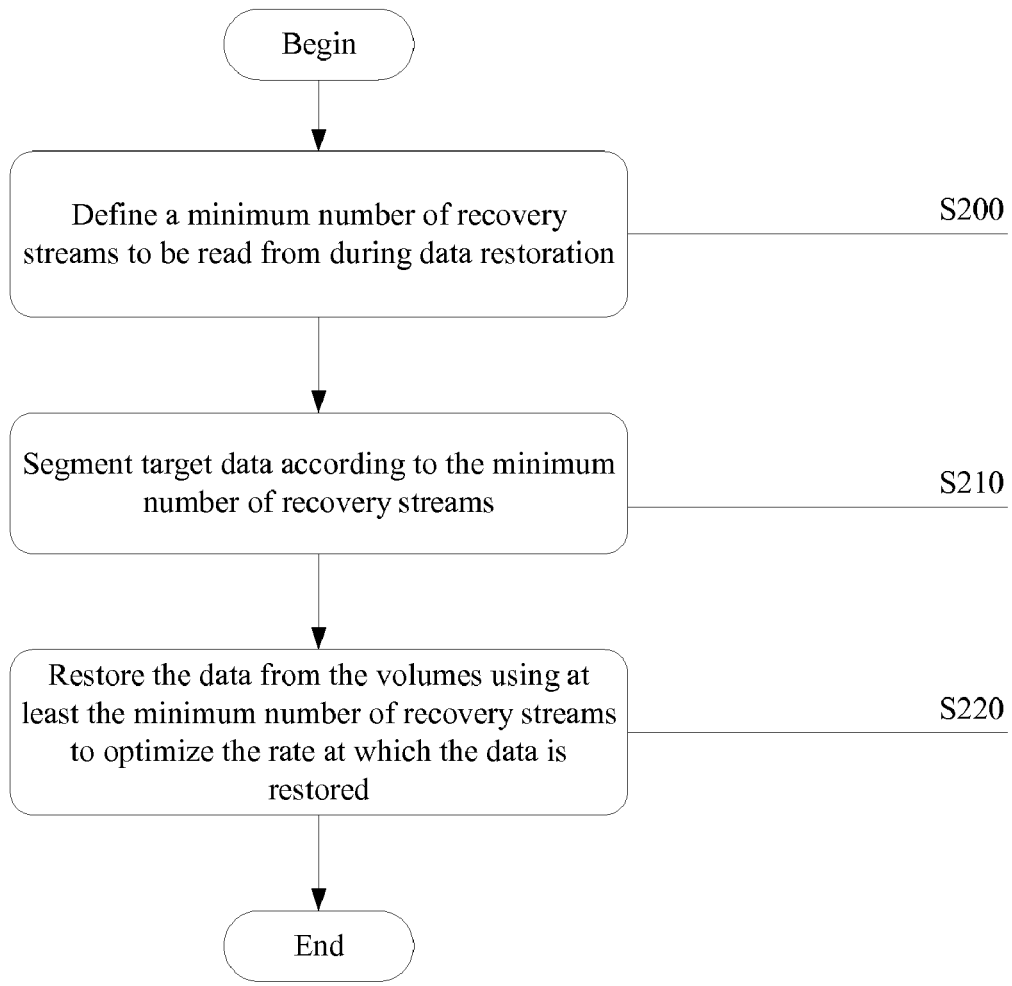
FIG. 2 is a flow diagram of a data recovery method that uses a minimum number of recovery streams, in accordance with one embodiment.

Referring to FIGS. 1 and 2, to take advantage of the above implementation, in accordance with one embodiment, a data management module 112 may be configured to define a minimum number of recovery streams to be read from during data restoration (S200). The minimum number of streams may be determined and updated by a system administrator, by an algorithm or heuristic, or in response to one or more parameters associated with computing environment 100 to optimize the data restoration process in view of information available about the resources in the computing environment 100.

Depending on implementation, such parameters may provide information about the level of resources utilized, such as the network load, or the network bandwidth. For example, in one scenario, data management module 112 may monitor network load and bandwidth to evaluate the availability of resources in network 130 and set the minimum number of recovery streams to a value that maximizes network efficiency without overburdening the resources.

In one embodiment, data management module 112 may use timing results from one or more test runs for restoring a predetermined number of files or a total quantity of test data to determine the optimal number of streams that may be used depending on network bandwidth or system capacity. For example, the test data may be 100 GB in total size and comprised of 400,000 files. A first test may be for restoring the 100 GB load using a single stream (e.g., transfer session). In other tests, two or more streams may be utilized to provide a comparative result for restoring different same or other data volumes using different number of streams.

In some embodiments, network monitoring tools may be utilized to monitor system or network load and provide statistical results that can be used by data management module 112 to determine the minimum number of streams that achieve optimum results (e.g., throughput) for future data restoration sessions. Once data management module 112 defines the minimum number of streams, data management module 112 may segment the target data so that the data can be restored from the one or more storage volumes, according to the defined minimum number of recovery streams (S210).

In some embodiments, the above scheme determines the minimum number of recovery streams that are to remain available, desirably during a part or the entire restoration process. The number of recovery streams may be determined prior to the restoration process begins or adjusted during the restoration process, for example.

Depending on implementation, in some embodiments, the number of data streams may be adjusted, in real time or dynamically, as the availability of system resources changes over time. That is, data management module 112 may adjust the number of recovery streams, in response to detecting a change in the availability of system resources. Accordingly, data management module 112 may restore the data from the target volumes using at least the minimum number of recovery streams in a manner that optimizes the rate at which the data is restored (S220).

Figure 3:
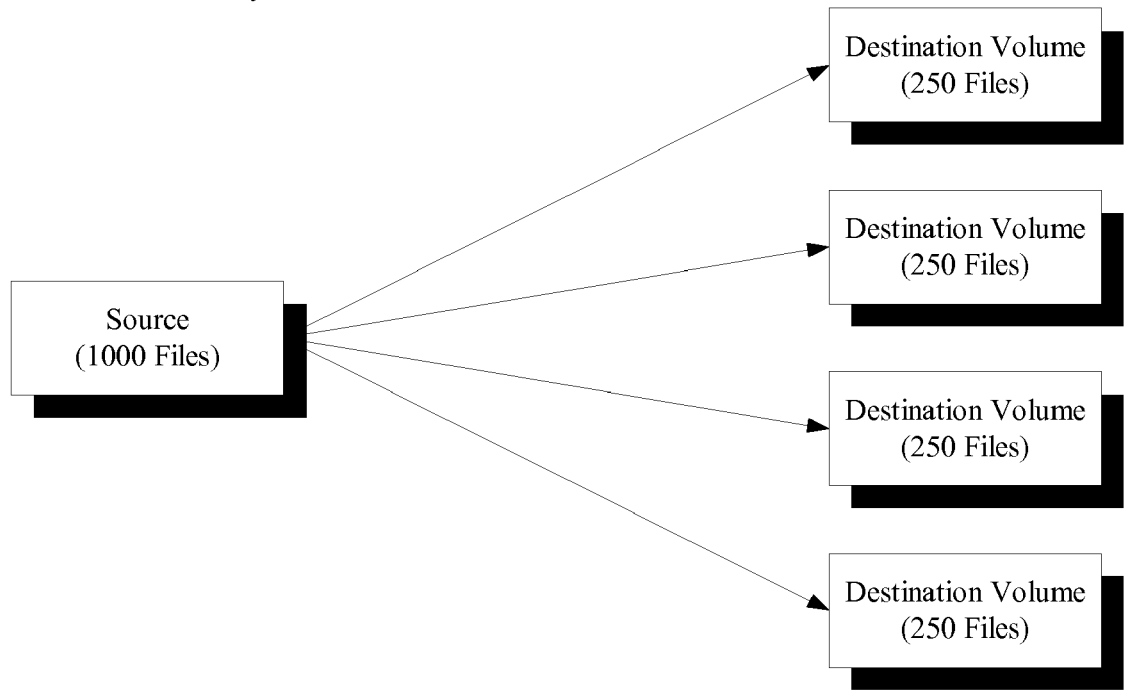
FIG. 3 illustrates segmentation of data over a minimum number of recovery streams, in accordance with an exemplary embodiment.

In accordance with one embodiment, the data segmentation is distributed, for example uniformly, among several storage volumes to optimize parallel access to storage devices 114, as shown in FIG. 3. In the exemplary embodiment illustrated in FIG. 3, the minimum number of recovery streams is set to 4 and 1000 files are segmented over four volumes, allowing 4 read operations (i.e., one read operation for each of the 4 volumes) during the data restoration process.

Accordingly, specifying the minimum number of recovery streams helps a data management module 112 perform policy based data restoration or migration operations in an optimal manner. Data management module 112 may move data to different storage devices for a number of reasons. For example, data may be stored or migrated to a disk during a nightly backup session or stored to tape volumes for efficiency. As such, data management module 112 may manage the data movement during a migration process by determining the number of data streams that allow for the most efficient data restoration process.

In some embodiments, data management module 112 may use file attributes or characteristics to allow similar types of data files to be stored together on sequential volumes. In different embodiments, the invention may be implemented either entirely in the form of hardware or entirely in the form of software, or a combination of both hardware and software elements. For example, computing environment 100 may be presented largely in terms of hardware components and software code executed to perform processes that achieve the results contemplated by the system of the present invention.

Figure 4:
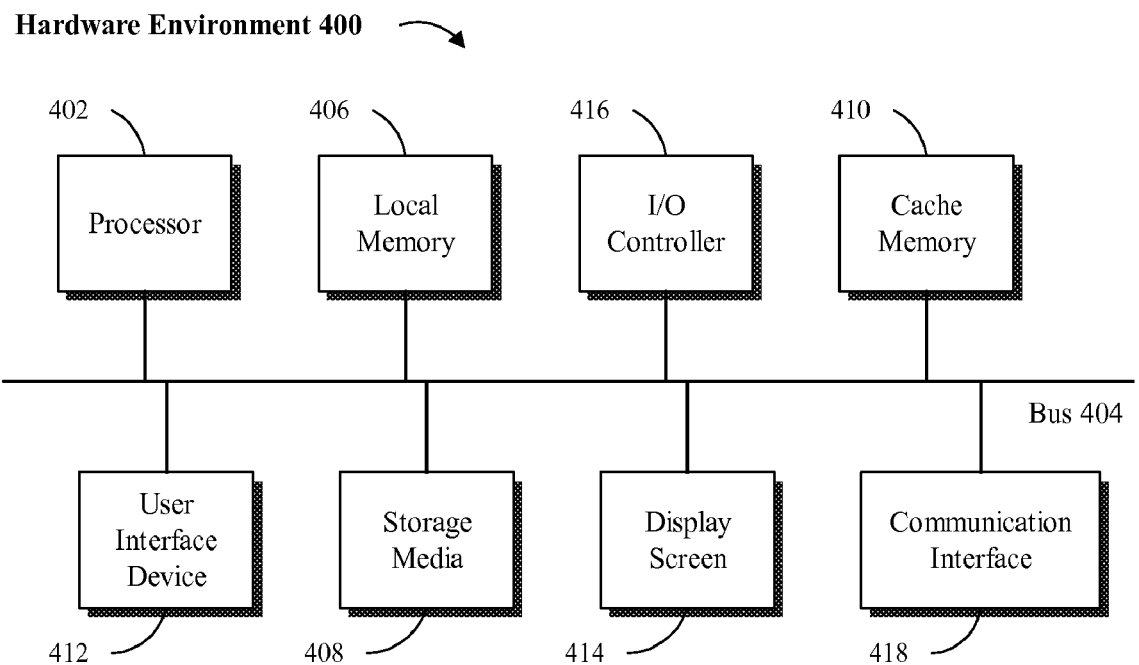
FIGS. 4 and 5 are block diagrams of hardware and software environments in which a system of the present invention may operate, in accordance with one or more embodiments.
Figure 5:
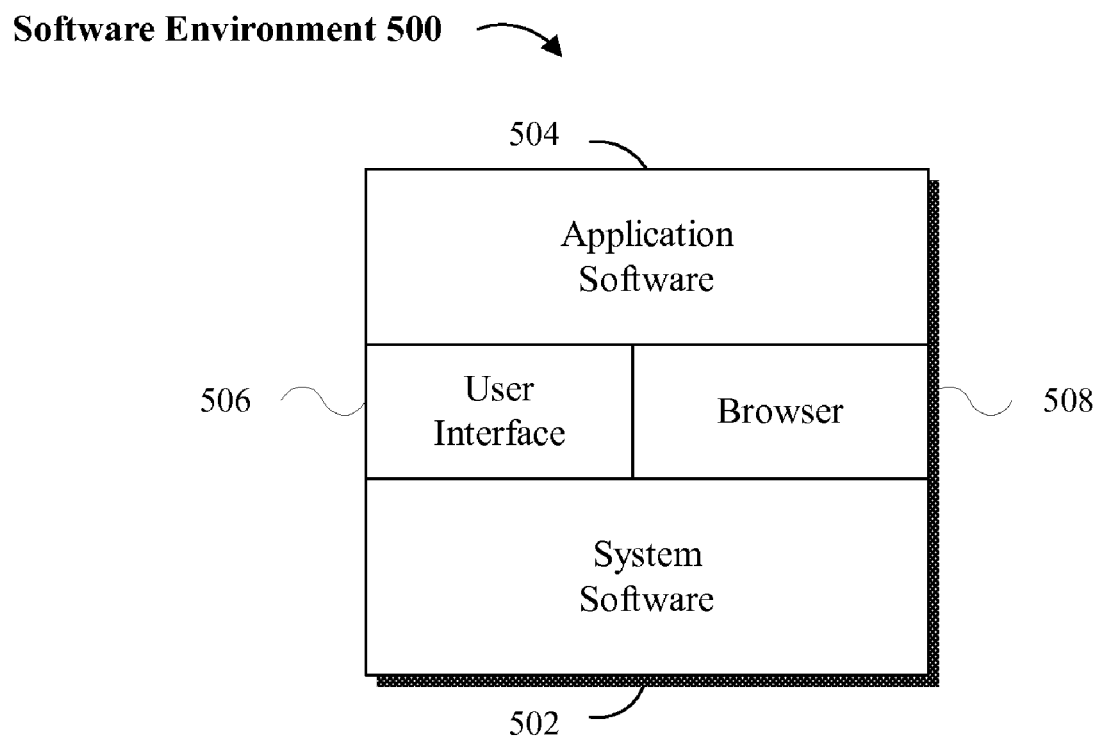

Referring to FIGS. 4 and 5, computing environment 100 in accordance with an exemplary embodiment may be composed of a hardware environment 400 and a software environment 500. The hardware environment 400 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 500 is divided into two classes comprising system software 502 and application software 504. System software 502 comprises control programs, such as the operating system (OS) and information management systems that instruct the hardware how to function and process information.

In one embodiment, data management module 112 may be implemented as system software 502 or application software 504 executed on one or more hardware environments to facilitate memory sharing among networked computing systems. Application software 504 may comprise but is not limited to program code, data structures, firmware, resident software, microcode or any other form of information or routine that may be read, analyzed or executed by a microcontroller.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device.

The computer-readable medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital videodisk (DVD).

Referring to FIG. 4, an embodiment of the system software 502 and application software 504 may be implemented as computer software in the form of computer readable code executed on a data processing system such as hardware environment 400 that comprises a processor 402 coupled to one or more computer readable media or memory elements by way of a system bus 404. The computer readable media or the memory elements, for example, can comprise local memory 406, storage media 408, and cache memory 410. Processor 402 loads executable code from storage media 408 to local memory 406. Cache memory 410 provides temporary storage to reduce the number of times code is loaded from storage media 408 for execution.

A user interface device 412 (e.g., keyboard, pointing device, etc.) and a display screen 414 can be coupled to the computing system either directly or through an intervening I/O controller 416, for example. A communication interface unit 418, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 400 may not include all the above components, or may comprise other components for additional functionality or utility. For example, hardware environment 400 may be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In certain embodiments of the system, communication interface 418 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 5, system software 502 and application software 504 may comprise one or more computer programs that are executed on top of an operating system after being loaded from storage media 408 into local memory 406. In a client-server architecture, application software 504 may comprise client software and server software. For example, in one embodiment of the invention, client software is executed on one or more computing systems and server software is executed on a server system (not shown).

Software environment 500 may also comprise browser software 508 for accessing data available over local or remote computing networks. Further, software environment 500 may comprise a user interface 506 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods, and the order in which the respective steps of each method are performed are purely exemplary. Depending on implementation, the steps may be performed in any order or in parallel, unless indicated otherwise in the present disclosure. Further, the logic code is not related, or limited to any particular programming language, and may comprise of one or more modules that execute on one or more processors in a distributed, non-distributed or multi-processing environment.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A data recovery method comprising:

defining a minimum number of recovery streams to be read from during restoration of data from one or more storage volumes in a communication network based on a plurality of data recovery test runs performed on test data using various numbers of recovery streams to recover said test data from the one or more storage volumes in the communication network,
wherein the minimum number is determined according to one or more parameters defining availability of one or more resources in the communication network based on statistical analysis of collective results of data recovery test runs performed over the same communication network in advance of the restoration operations to determine optimum data restoration rates for the communication network in which the recovery streams are to be implemented;

restoring data stored on the one or more storage volumes using at least the minimum number of recovery streams determined based on the test runs to optimize the rate at which the data is restored;

dynamically changing the minimum number of recovery streams, during the data restoration process, in response to determining that the availability of the one or more resources has changed,
wherein the recovery streams provide means for reading data from or writing data to the one or more storage volumes;

segmenting the data being restored; and distributing the data over a plurality of storage volumes so that at least the minimum number of recovery streams are made available during data recovery to optimize parallel access to the data.

2. The method of claim 1, further comprising:

wherein the distributing comprises migrating the data at least partially from one storage volume to another storage volume during the data recovery, and wherein the segmenting comprises using file attributes to allow similar types of data files to be stored together on sequential storage volumes.

3. The method of claim 1, further comprising implementing active data pools to eliminate commingling of active data with inactive data on a storage volume.

4. The method of claim 1, further comprising implementing a no query restore scheme to read data from a random access memory storage volume in a single session.

5. The method of claim 1, further comprising implementing a no query restore scheme to read data from one or more sequential storage volumes in one or more sessions.

6. A data recovery system comprising:
one or more processors for executing instructions to restore data from one or more data storage volumes in a communication network;
a logic unit for defining a minimum number of recovery streams to be read from during restoration of data from the one or more storage volumes in the communication network based on a plurality of data recovery test runs performed on test data using various numbers of recovery streams to recover said test data from the one or more storage volumes in the communication network,
wherein the minimum number is determined according to one or more parameters defining availability of one or more resources in the communication network based on statistical analysis of collective results of test runs performed in advance of the restoration operations to determine optimum data restoration rates for the communication network in which the recovery streams are to be implemented;
a logic unit for restoring data other than test data stored on the one or more storage volumes using at least the minimum number of recovery streams determined based on the test runs to optimize the rate at which the data is restored;
a logic unit for dynamically changing the minimum number of recovery streams, during the data restoration process, in response to determining that the availability of the one or more resources has changed,
wherein the recovery streams provide means for reading data from or writing data to the one or more storage volumes;
a logic unit for segmenting the data being restored; and
a logic unit for distributing the data over a plurality of storage volumes so that at east the minimum number of recovery streams are made available during data recovery to optimize parallel access to the data.

7. The system of claim 6,
wherein the distributing comprises migrating the data at least partially from one storage volume to another storage volume during the data recovery, and
wherein the segmenting comprises using file attributes to allow similar types of data files to be stored together on sequential storage volumes.

8. The system of claim 6, further comprising a logic unit for implementing active data pools to eliminate commingling of active data with inactive data on a storage volume.

9. The system of claim 6, further comprising a logic unit for implementing a no query restore scheme to read data from a random access memory storage volume in a single session.

10. The system of claim 6, further comprising a logic unit for implementing a no query restore scheme to read data from one or more sequential storage volumes in one or more sessions.

11. A computer program product comprising a non-transient computer useable data storage medium having a computer readable program, wherein the computer readable program when executed on a computer causes the computer to:
define a minimum number of recovery streams to be read from during restoration of data from one or more storage volumes in a communication network based on a plurality of data recovery test runs performed on test data using various numbers of recovery streams to recover said test data from the one or more storage volumes in the communication network,
wherein the minimum number is determined according to one or more parameters defining availability of one or more resources in the communication network based on statistical analysis of results of test runs performed in advance of the restoration operations to determine optimum data restoration rates for the communication network in which the recovery streams are to be implemented;
restore data other than test data stored on the one or more storage volumes using at least the minimum number of recovery streams determined based on the test runs to optimize the rate at which the data is restored;
dynamically change the minimum number of recovery streams, during the data restoration process, in response to determining that the availability of the one or more resources has changed,
wherein a recovery stream provides means for reading data from or writing data to the one or more storage volumes;
segment the data being restored;
and distribute the data over a plurality of storage volumes so that at least the minimum number of recovery streams are made available during data recovery to optimize parallel access to the data.

12. The computer program product of claim 11,
wherein the distributing comprises migrating the data at least partially from one storage volume to another storage volume during the data recovery, and
wherein the segmenting comprises using file attributes to allow similar types of data files to be stored together on sequential storage volumes.

13. The computer program product of claim 11, wherein the computer readable program when executed on a computer further causes the computer to implement active data pools to eliminate commingling of active data with inactive data on a storage volume.

14. The computer program product of claim 11, wherein the computer readable program when executed on a computer further causes the computer to implement a no query restore scheme to read data from a random access memory storage volume in a single session and to read data from one or more sequential storage volumes in one or more sessions.

* * * * *